(No Model.)
W. F. NORTH.
WATER CLOSET.
No. 387,804. Patented Aug. 14, 1888.
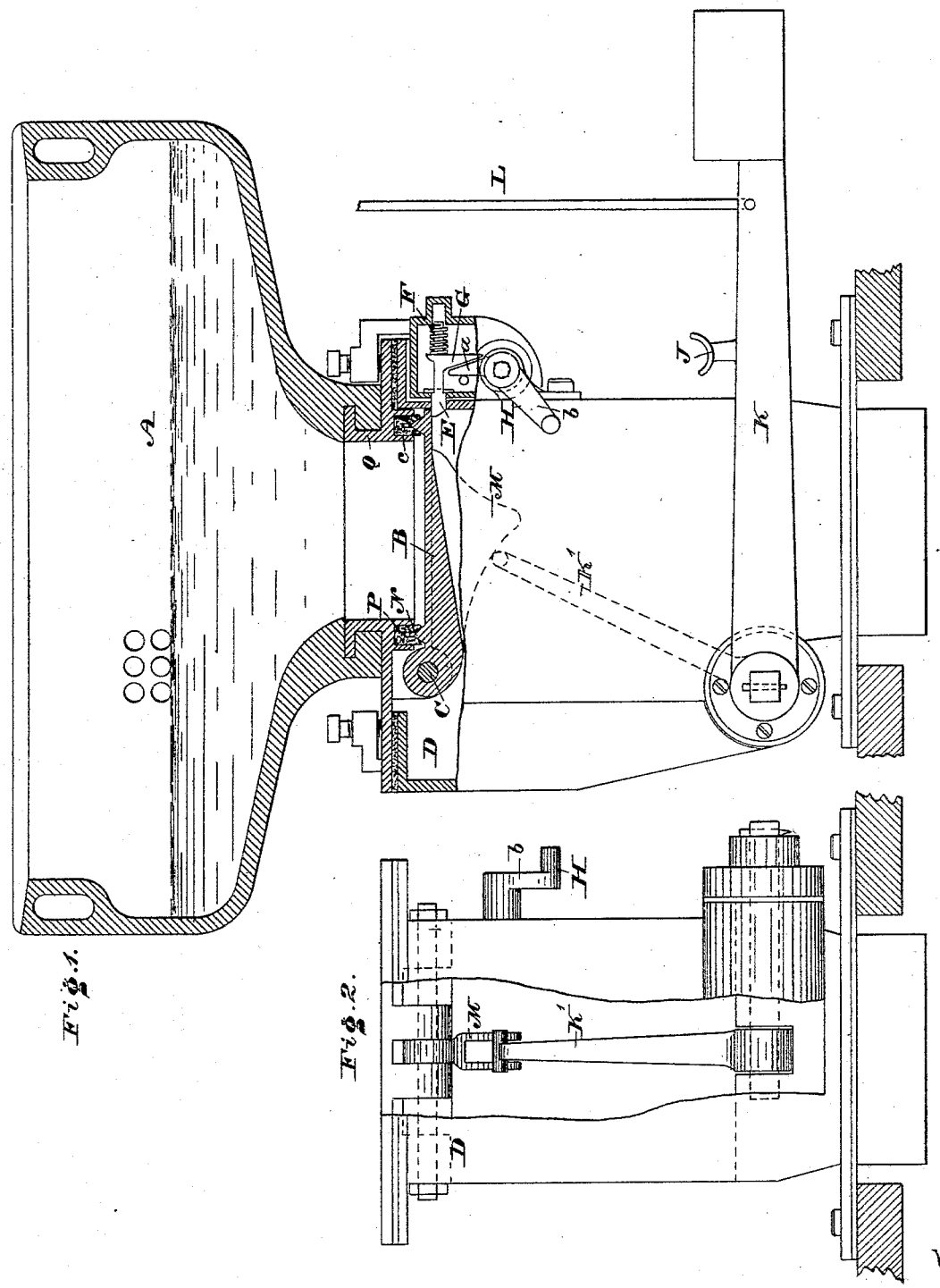
WITNESSES:
Th. Rollé.
Jas. P. Kelly.
INVENTOR:
Wm. F. North.
BY Biedershaim & Kintner
ATTORNEYS.

UNITED STATES PATENT OFFICE.

WILLIAM F. NORTH, OF PHILADELPHIA, PENNSYLVANIA.

WATER-CLOSET.

SPECIFICATION forming part of Letters Patent No. 387,804, dated August 14, 1888.

Application filed May 19, 1887. Serial No. 238,714. (No model.)

*To all whom it may concern:*

Be it known that I, WILLIAM F. NORTH, a citizen of the United States, residing in the city and county of Philadelphia, State of Pennsylvania, have invented a new and useful Improvement in Water-Closets, which improvement is fully set forth in the following specification and accompanying drawings.

My invention relates to improvements in water-closets; and it consists of the novel construction and combination of parts, as will be hereinafter set forth and claimed.

Figure 1 represents a partial vertical section and partial side elevation of a water-closet embodying my invention. Fig. 2 represents a side elevation of a portion thereof at a right angle to Fig. 1.

Similar letters of reference indicate corresponding parts in the two figures.

Referring to the drawings, A represents a hopper or basin of a water-closet, and B represents a swinging valve or pan at the bottom thereof, said valve having a horizontal axis, C, whose bearings are on the frame or casing D beneath the hopper A.

E represents a spring-pressed latch or bolt, which is supported on the frame D opposite to the axis C and located below the valve B, so as to hold the same in closed position, as clearly shown in Fig. 2. The spring F of the bolt is connected with the same and with a proper part of the frame D in any suitable manner. Connected or formed with the bolt is an arm, G, with which engages one limb, $a$, of a rocking lever, H, whose axis is on the frame D. The other limb, $b$, of said lever is so disposed that it may be engaged by an arm, J, on the weighted lever K, the latter being pivoted to the base of the frame or casing D and having attached to it a rod, chain, or other connection, L, whereby said lever may be raised.

The lever K has an upwardly-projecting limb, K', which bears against an inclined or curved piece or a segmental flange, M, formed with or secured to the under side of the valve B, so as to uphold the latter and retain it firmly in closed position, the face of the flange M being eccentric to the axis of the valve.

The operation is as follows: When it is desired to open the valve, the lever K is raised by means of the connection L, whereby its limb K' moves in a direction toward the axis of the valve. Simultaneously therewith the arm J strikes the lever H and causes it to rotate, so as to withdraw bolt E from its position under the valve. The valve now loses its support, and it consequently drops and opens, thus permitting the discharge of the contents of the hopper in a sudden and rapid manner. When the handle of the connection L is let go, the lever K lowers and its limb K' bears forcibly upward against the flange M, thus raising it or returning it to closed position. The bolt E is forced back by the edge of the valve, and when its nose is cleared of the latter said bolt shoots forward and assumes its proper position, locking the valve. The upper face of the valve has a V-shaped rib, N, on which is fitted a packing-ring, P. The under side of the support Q of the hopper has an annular groove, $c$, to receive said ring, it being evident that owing to the upward pressure of the valve and the expanding action of the rib N the packing is firmly compressed on the walls of the groove $c$ as its seat, thus producing a tight joint for the valve.

Having thus described my invention, what I claim as new, and desire to secure by Letters Patent, is—

1. In a water-closet, the combination of a basin, a swinging valve with segmental under face, a spring-bolt adapted to lock said valve, a rocking lever operating said bolt, and a lever having an arm to operate said rocking lever and an arm to close said valve, substantially as described.

2. In a water-closet, the combination of a basin with a swinging valve at outlet thereof, a spring-bolt adapted to lock said valve, a rocking lever adapted to withdraw said spring-bolt, and a lever with an arm adapted to operate said rocking lever, substantially as described.

3. The combination of the basin A with the swinging valve B, having horizontal shaft C and a segmental under face, the spring-bolt E, having the arm G, the rocking lever H, having the arms $a$ and $b$, and the weighted pivoted lever K, with the arm K', adapted to close said valve B, and the arm J, adapted to operate said rocking lever H, so as to withdraw said bolt and thereby operate said valve, substantially as described.

WM. F. NORTH.

Witnesses:
JOHN A. WIEDERSHEIM,
A. P. JENNINGS.